United States Patent

Auerbach et al.

[11] Patent Number: 5,850,286
[45] Date of Patent: Dec. 15, 1998

[54] FIBER OPTIC GYRO WITH OPTICAL INTENSITY SPIKE SUPPRESSION

[75] Inventors: Daniel E. Auerbach, Thousand Oaks; Amado Cordova, West Hills; Eric L. Goldner, Valencia; John E. Higbee, Simi Valley, all of Calif.; James R. Steele, Jackson, Wyo.; Ka Kha Wong, Westlake Village, Calif.

[73] Assignee: Litton Systems, Inc., Woodland Hills, Calif.

[21] Appl. No.: 854,664

[22] Filed: May 12, 1997

[51] Int. Cl.$^6$ .................................................. G01C 19/72
[52] U.S. Cl. .............................................................. 356/350
[58] Field of Search .............................................. 356/350

[56] References Cited

U.S. PATENT DOCUMENTS

| | | |
|---|---|---|
| 5,116,127 | 5/1992 | Gröllmann . |
| 5,133,600 | 7/1992 | Schröder . |
| 5,137,359 | 8/1992 | Steele . |
| 5,189,488 | 2/1993 | Mark et al. . |
| 5,214,488 | 5/1993 | Büschelberger et al. . |
| 5,268,740 | 12/1993 | Gröllmann . |
| 5,272,516 | 12/1993 | Ashizuka ................................ 356/350 |
| 5,337,143 | 8/1994 | Mark et al. . |
| 5,365,338 | 11/1994 | Bramson ................................ 356/350 |
| 5,473,430 | 12/1995 | Kemmler . |
| 5,485,274 | 1/1996 | Kemmler . |
| 5,530,545 | 6/1996 | Pavlath . |

Primary Examiner—Samuel A. Turner
Attorney, Agent, or Firm—Elliott N. Kramsky

[57] ABSTRACT

An interferometric rotation rate sensor is arranged to overcome effects of the unavoidable generation of intensity spikes in the modulated optical output. An electrooptical device is located within the optical path of the sensor for receiving the optical output signal from the sensor coil and transforming it prior to application to the photodetector. The electrooptical device is driven by a periodic electrical signal with a period equal to the loop transit time of light traveling through the sensor coil. By synchronizing the periods of attenuation with the predictable presence of spikes in the optical output, valid optical signal information is preserved while gyro electronics are sheltered from the results of optical intensity spiking.

5 Claims, 4 Drawing Sheets

FIBER OPTIC GYRO WITH OPTICAL INTENSITY SPIKE SUPPRESSION

BACKGROUND OF THE INVENTION

1. Field of the Invention

The invention relates to rotation rate sensors. More particularly, the invention pertains to a method and apparatus for reducing the influence of modulation transition-induced voltage spikes upon the output of an interferometric fiber optic gyro.

2. Description of the Prior Art

In the operation of an interferometric fiber optic gyro (IFOG) an artificial phase difference is routinely superimposed between two counterpropagating light waves by means of a phase modulator. The phase modulation generally alternates in amplitude between $\pm\pi/2$ radians and the gyro output is sampled at those points, which correspond to the points of maximum measurement sensitivity of the interferometer output to rotation-induced Sagnac phase shifts. Alternative modulation schemes (so-called "overmodulation"), which employ phase modulation depths that may exceed $\pi/2$, are sometimes employed that offer other advantages such as improvement in the signal-to-noise ratio.

A square wave modulation waveform in commonly employed for generating the gyro output signal. While such a waveform is readily approximated by the output of present-day phase modulators, the transition between the $\pm\pi/2$ modulation values is not instantaneous. Rather the so-called square wave output of the phase modulator includes discrete transition periods on the order of 100 nanoseconds during which the modulation assumes a continuum of values between $+\pi/2$ and $-\pi/2$. This phenomenon is illustrated in FIG. 1, a graphical representation of the square wave output of a gyro phase modulator. As can be seen, while the modulation output essentially shifts between $+\pi/2$ and $-\pi/2$, over small periods of time $\Delta t$ the phase modulator imposes all artificial phase differences therebetween. As a consequence, a large portion of the interferometer output intensity range is scanned between these values. Significantly, such range of values includes maximum intensity as well as an infinite number of adjacent values. It is well known that, at zero phase difference, the energies of the two beams counterpropagating within the gyro sensor coil produce total constructive interference, resulting in maxima of the interferometer output characteristic $(1+\cos\theta)$ where $\theta$ is the phase difference between the counterpropagating beams. This same phenomenon occurs at $\theta=n2\pi$ where n is a (positive or negative) integer.

FIG. 2 is a graph of the above-described relationship between interferometer output and phase difference $\theta$. The portion of the intensity-versus-phase difference indicated in bold at 10 illustrates the variation in interferometer output intensity that is "picked up" as the square wave output of the gyro phase modulator momentarily (i.e. over $\Delta t$) scans interferometer output in shifting between the points of primary interest, $+\pi/2$ and $-\pi/2$. The periodic compression of the output scanning process into the periods of very small duration $\Delta t$ is reflected in the measured gyro output by the so-called "ears" 12 that are found in the intensity-versus-time gyro output characteristic curve as illustrated in FIG. 3. Such ears are periodic and separated in time from one another by $\tau$, the gyro sensor loop transit time. In general, each transition spike in the output intensity results from passage through the maximum point of the intensity transfer function where the phase shifts from one side to the other side of the maximum intensity value.

The periods of the output curve of FIG. 3 between the ears, or output spikes, represent the useful output intensities $I_i$ and are determined in part by the rate of rotation of the IFOG around the coil input axis. Under the well-know Sagnac principle, the output of the gyro experiences a phase shift $\phi$ in the presence of a rate of rotation about the sensor coil input axis. (Note, even in the absence of rotation rate, ears are present in the output of FIG. 3 resulting from the modulation process itself.) Commonly employed signal processing schemes for extracting rotation rate information from detected signal are based upon synchronous demodulation in which the difference between successive signal levels $I_i$ that correspond to $\pm\pi/2$ modulation intervals is proportional to the measured input rate.

No useful information is obtained during the finite duration of a transition spike in the intensity output (i.e. FIG. 3) of a interferometric gyro. The unavoidable presence of intensity spikes in the output of present day IFOG's produces numerous problems. These are generally related to the electronic operation and performance of the gyro. Typically, present-day IFOG's employ a photodetector to detect the optical output and to generate a corresponding useful electrical signal. The spikes in the optical intensity output produce pulses in the output of the photodetector. Such pulses can decrease gyro accuracy despite the fact that the useful signal between the transition spikes is only sampled after pulse decay. The existence of pulse decay instabilities can adversely affect high accuracy applications as differential rates of decay may introduce rate measurement errors. In addition, the relative amplitude of the transition spike—as opposed to the useful signal—limits the permissible gain of the gyro's front end signal processing electronics as well as the maximum values of front end amplifier feedback resistors. Such limitations increase overall instrument noise, an effect that is particularly evident in the case of very deep values of overmodulation ($\theta>3\pi/4$). Alternatively, front end saturation can cause significant performance problems as the finite recovery times of the detector and/or front end amplifiers require that the maximum possible values of the feedback resistors of front end gain elements be limited by the amplitudes of the spikes rather than those of the useful signal.

Attempts to minimize the deleterious effects of signal spikes have centered upon processing of the resultant electrical output of the gyro and have included the incorporation of a gate into the signal processing to block photodetector output for the period corresponding to the intensity spike. Such solution is of limited benefit with respect to gyro front end gain. Since the optical intensity signal is received at the photodetector, the problem of saturation of the photodetector and/or front end amplifiers remains. Further, the incorporation of a gate fails to address the errors that result from differing rates of electrical pulse decay.

SUMMARY OF THE INVENTION

The present invention addresses the shortcomings of the prior art by providing, in a first aspect, a fiber optic rotation rate sensor. Such sensor includes a source of optical energy. An optical fiber is formed into a coil located intermediate its opposed ends. Means are provided for dividing the output of the source into two light beams and for launching the light beams into the fiber to counterpropagate within the coil. Means are also provided for imposing a periodic artificial phase difference between the counterpropagating beams of light and for recombining the counterpropagating beams into an optical output signal.

Means are provided for selectively attenuating the optical output signal. A photodetector receives the selectively attenuated optical signal and converts it to a responsive electrical signal.

In a second aspect, the invention provides an improvement in a rotation rate sensor of the type that includes an optical fiber having an internal coiled portion defining an input axis, a coupler for dividing light traveling within the fiber upon entering the coil into counterpropagating beams, a phase modulator for applying a periodic, artificial phase difference between the counterpropagating beams and a photodetector for receiving an optical signal and converting it to an electrical signal. The improvement provided by the invention includes means for receiving the optical output signal and producing a transformed optical signal for application to the photodetector. Such means comprises an electrooptical device.

In a third aspect, the present invention provides a method for detecting rotation rate about a predetermined space axis. Such method is begun by forming a coil having an axis of symmetry interior of an optical fiber. Such axis is then aligned with the predetermined space axis. The output of a source of optical energy is split to form two light beams and such light beams are injected into opposite ends of the optical fiber whereby the beams counterpropagate and interfere within the coil.

Predetermined phase differences are periodically imposed between the counterpropagating beams to modulate them. The modulated optical output of the interfering beams is received and selectively attenuated. The attenuated optical output is converted into a corresponding electrical signal which is then analyzed to determine rotation rate.

The present invention addresses the problems involved with phase modulation transition spikes by attenuating the optical signal in the IFOG during transition intervals. Each transition interval includes the time at which the output intensity reaches a maximum in the absence of the present invention. Attenuation of the intensity of the optical signal reduces the maximum signal reaching the detector during the phase modulation transition period.

Numerous embodiments are provided in accordance with the invention. One method includes attenuating the intensity of the optical signal during transition intervals below that of the useful signal. This way, the values of front end gain feedback resistors are limited by useful signal, rather than the transition spike, amplitude. Of course, any degree of attenuation of the transition spikes is beneficial.

An embodiment of this invention provides apparatus for attenuating the optical signal in an IFOG during transition intervals. An example of such an apparatus is an intensity modulator between the fiber coupler and the photodetector.

The present invention effectively decreases the maximum intensity of the optical signal that reaches the detector during the transition intervals. Any decrease in the maximum intensity results in the corresponding reduction of limitations on the front end gain characteristics of a typical detector. A decrease in the maximum amplitude of the optical signal generated leads also to a decrease in the amplitude of the tail of the electrical signal. In fact, any degree of attenuation of optical signal intensity spiking is beneficial.

An embodiment of the present invention provides an electrical gate in combination with an optical intensity modulator. The electrical gate blocks the electrical output signal as residual transition interval spiking of the optical signal is detected.

A further embodiment contemplates the use of an intensity modulator as an optical switch. Optical signal attenuation is such that the intensity modulator prevents almost all light from reaching the photodetector during the transition intervals. The intensity of the light that reaches the photodetector is dependent upon intensity modulator quality. Examples of appropriate intensity modulators include Mach-Zehnder interferometers and cutoff modulators. Since nearly no light is incident upon the photodetector during transition intervals, the front end gain of the gyro signal processing electronics can be determined from the intensity of the useful signal, rather than that of the intensity spikes.

Various methods and devices may be employed to modulate the intensity of the optical signal. In one embodiment, a discrete cutoff modulator is located between a coupler and the photodetector of the IFOG. Cutoff modulators of 10–20 dB isolation result in received intensity at the photodetector during transition times being less than the useful outputs.

Other objects, features and advantages of the present invention will become apparent from the detailed description that follows. Such description is accompanied by a set of drawing figures. Numerals of the drawing figures, corresponding to those of the written description, point to the various features of the invention. Like numerals refer to like features throughout both the written description and the drawing figures.

DESCRIPTION OF THE PREFERRED EMBODIMENT

Figure 4:
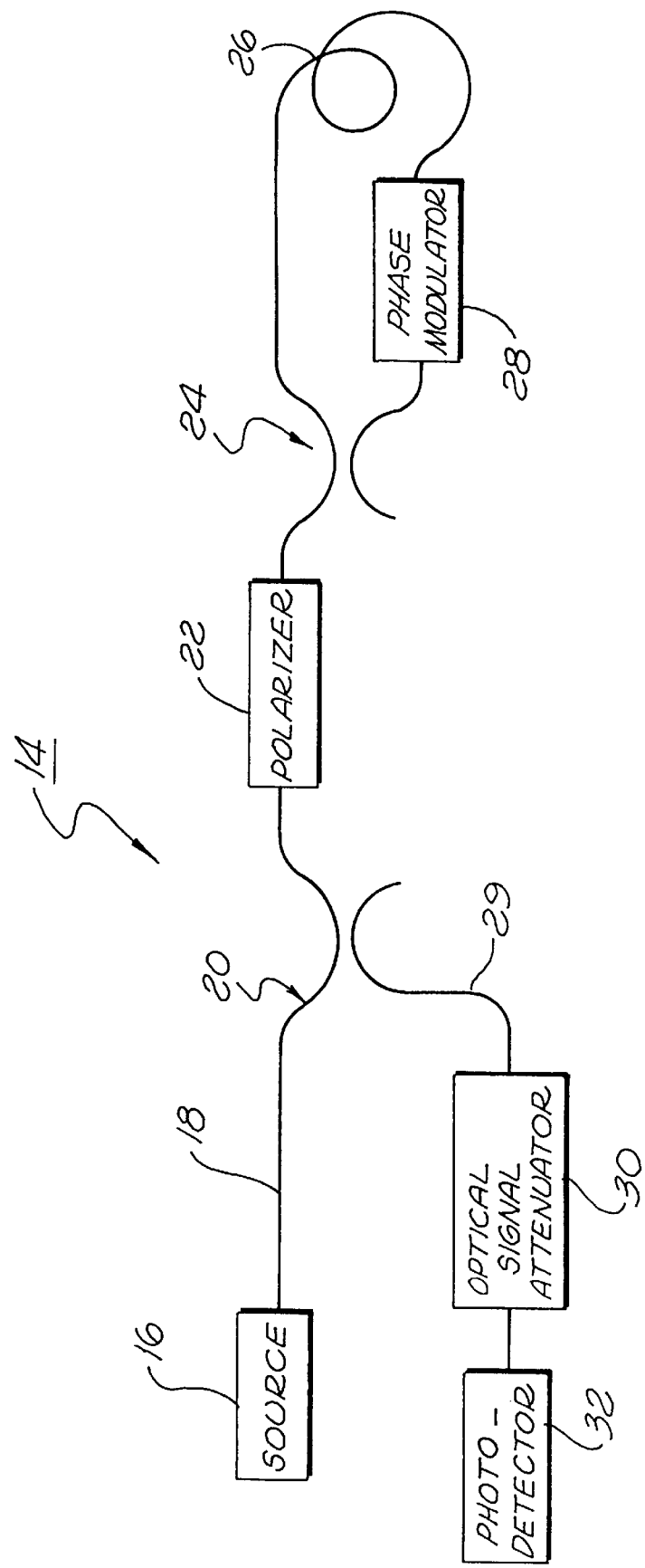
FIG. 4 is a schematic diagram of an IFOG in accordance with the invention.

Turning to the drawings, FIG. 4 is a schematic diagram of an IFOG 14 in accordance with the present invention. A source 16 of optical energy that may comprise, for example, a superluminescent diode (SLD), a laser diode, a superfluorescent source, a light emitting diode (LED) or equivalent means known to those skilled in the art emits optical energy of predetermined wavelength and bandwidth that travels through an optical fiber 18 to a first coupler 20 and then to a polarizer 22. A second coupler 24 receives the output of the polarizer 22, dividing it into a pair of waves that counterpropagate within a coil 26 of optical fiber whose central axis of symmetry coincides with the sensitive or input axis of the gyro 14.

Figure 1:
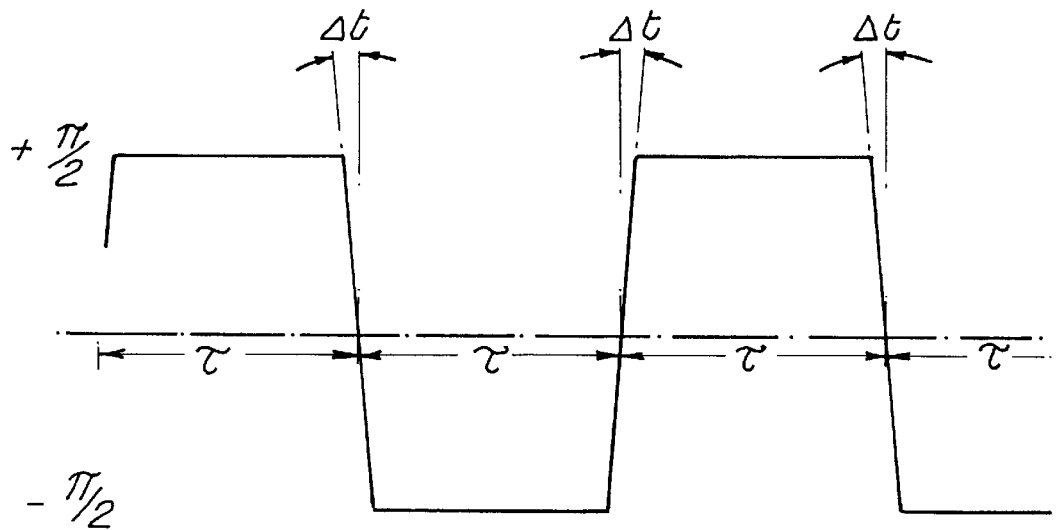
FIG. 1 is a diagram for illustrating $\pm\pi/2$ square wave modulation for application to light beams counterpropagating within the sensor coil of a fiber optic gyro with transition times $\Delta t$ exaggerated in duration.
Figure 2:
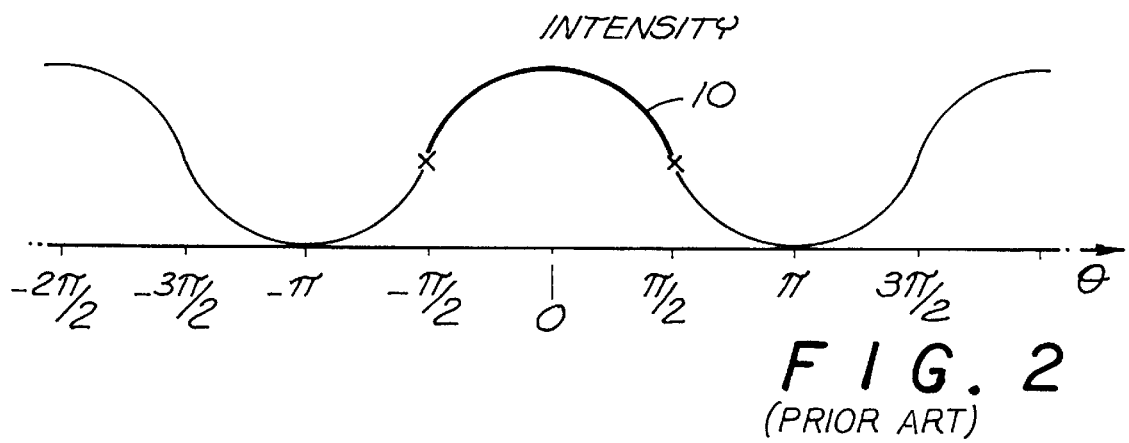
FIG. 2 is a diagram of the intensity-versus-phase shift output characteristic of an interferometer such as that exhibited by the output of the sensor coil of a fiber optic gyro.
Figure 6A:
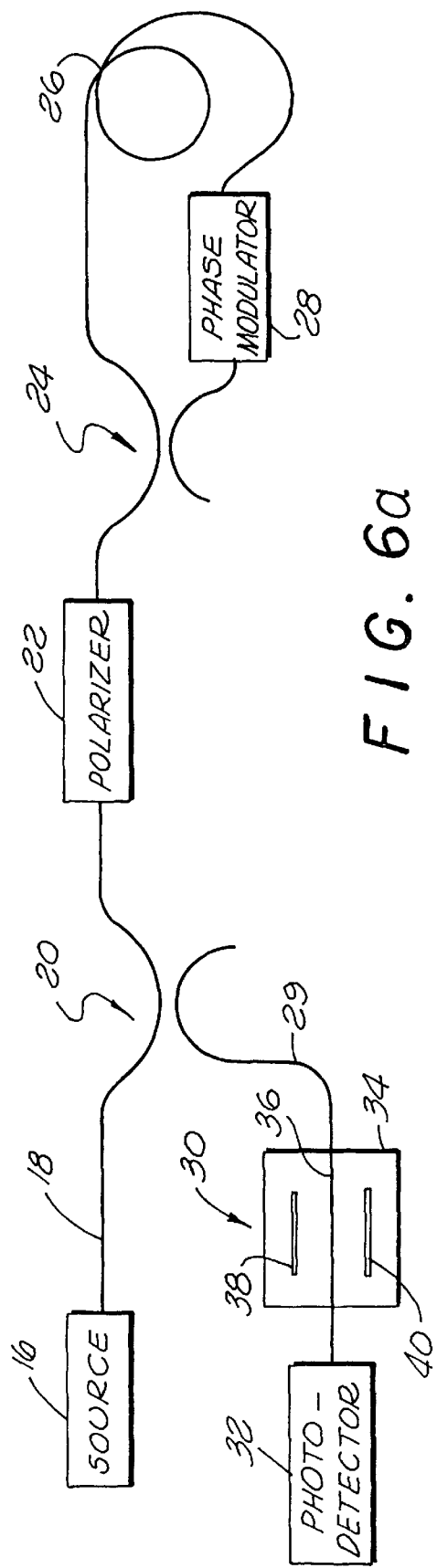
FIGS. 6(a) and 6(b) are schematic diagrams of alternative embodiments of IFOG's in accordance with the invention.
Figure 6B:
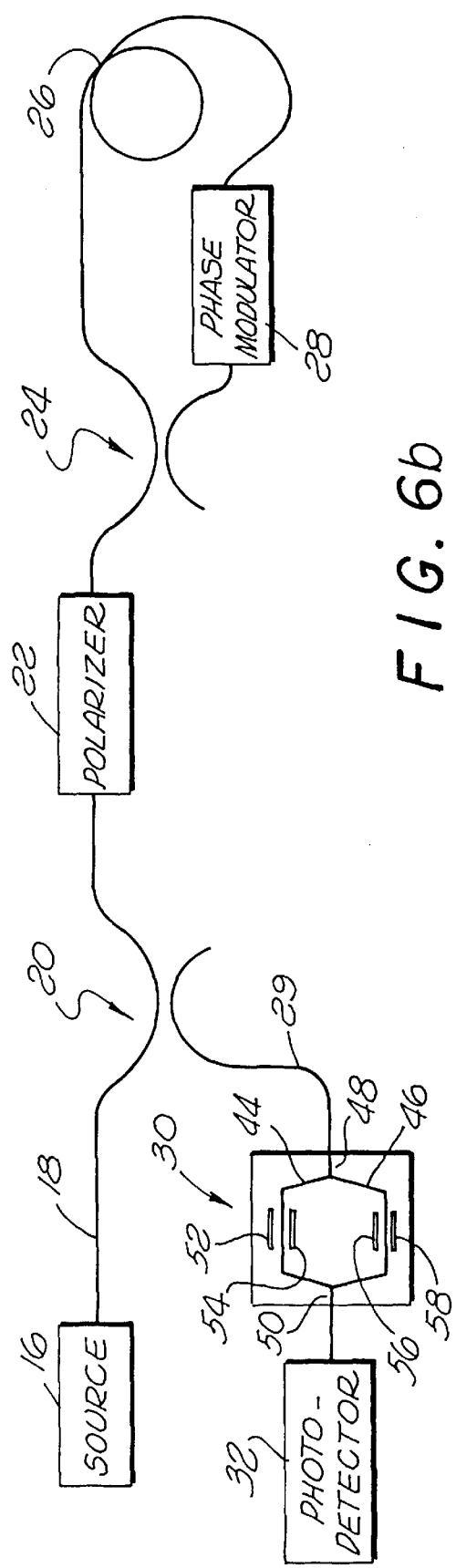

A phase modulator 28 lies within the optical path between the second coupler 24 and the optical fiber sensor coil 26 for applying a periodic artificial phase difference between light waves counterpropagating within the coil 26. Typically, the phase modulator 28 is arranged to apply a square wave function such as that illustrated in FIG. 1. Upon exiting the coil 26, the modulated, counterpropagating waves are combined to interfere at the second coupler 24. The resultant optical intensity signal is of the well-known form 1+cosθ where θ is the phase difference between the interfering light waves. This optical intensity signal propagates back through the polarizer 22 and to the first coupler 20 where a portion of the intensity is coupled to a fiber 29 that directs it to an optical signal attenuator 30. (The representation of the attenuator 30 in the context of the IFOG 14 of FIG. 4 is generic and intended to support the discussion of its basic operation. Specific alternative embodiments of an IFOG in accordance with the invention incorporating specific and distinct optical signal attenuators are illustrated in FIGS. 6(*a*) and 6(*b*).) The (optical signal) output of the attenuator 30 is directed to a photodetector 32 for conversion to an electrical signal suitable for electronic signal processing, including electronic gating of any residual modulation transition energy.

Figure 3:
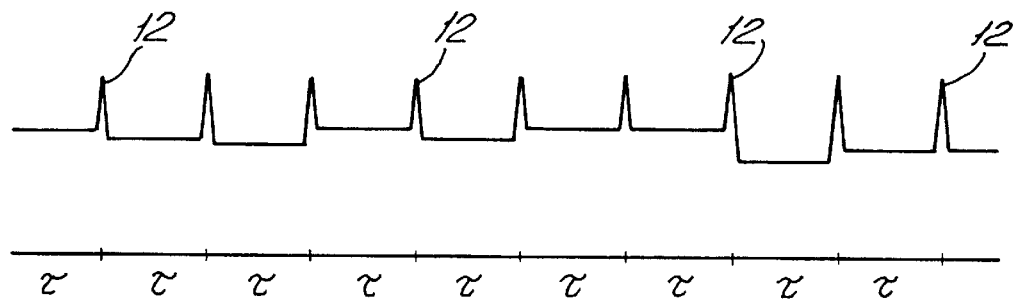
FIG. 3 is diagram of the intensity-versus-time output characteristic of a fiber optic gyro for modulation depths greater than zero and less than $\pi$ radians illustrating the presence of the periodic intensity spikes addressed by the present invention.

The device 30 acts to suppress the deleterious intensity spikes that characterize the interferometric optical signal output of the second coupler 24. FIGS. 5(*a*) through 5(*d*) are a series of timing diagrams for illustrating the operation of an IFOG in accordance with the invention. FIG. 5(*a*), generally corresponding to prior FIG. 1 although of different scale, illustrates the nominal ±π/2 square wave modulation applied by the phase modulator 28. FIG. 5(*b*), which replicates prior FIG. 3, illustrates the optical intensity-versus-time output of the coupler 20, combining the counterpropagating light beams from the sensor coil 26. The coupler 20 lies, in part, in an optical path between the coil 26 and the photodetector 32. As can be seen, the output signal of FIG. 5(*b*) is characterized by the inevitable presence of ears or intensity spikes, separated in time by τ, the sensor coil loop transit time (as well as the period of the applied optical phase modulation), whose origin is described above. As discussed, the presence of such intensity spikes in the interferometric optical output signal has been addressed in the past by post-photodetector 32 electronic signal processing techniques. In the invention, by contrast, the device 30 acts upon the optical signal prior to application to the photodetector 32, periodically attenuating the intensity of the optical signal of FIG. 5(*b*) to remove the intensity spikes prior to "conversion" of the information from the optical to the electrical domain. By thus pre-filtering the harmful and useless portions from the optical signal, the numerous harmful effects that otherwise unavoidably impact upon the electronics of the gyro are avoided. Since significant optical intensity spikes do not become inputs to the photodetector 32, prior art gyro design limitations related to handling of the resultant electrical signal are mitigated. In the case of some applications, such as those dealing with small amplitude optical signals, it will still be advisable to process the electrical signal output from the photodetector 32 by means of electronic gates. However, in contrast with the types of electrical gating apparatus necessitated by prior art arrangements, much smaller and simpler electronic gates are required for use in conjunction with the invention. As a consequence, the saturation issues posed by electronic signal gating in the prior art are much less significant in conjunction with the invention.

Alternative arrangements and embodiments of the invention will be discussed below. However, regardless of the particulars of the embodiment chosen, the resultant functioning of the invention may be described with reference to the timing diagrams of FIGS. 5(*a*) through (*d*). FIG. 5(*c*) is a timing diagram of the electrical signal for driving the optical signal trimming device 30 of the IFOG 14. As is seen, the signal is periodic with a period of τ, the loop transit time. While the signal of FIG. 5(*c*) is illustrated as a single and pulsed signal, its particular form will vary in accordance with the physical arrangement of the device 30 within an IFOG in accordance with the invention. The particulars of the electrical signal for driving the device 30, in relation to the type of modulator 30 employed, will be well understood by those skilled in the art.

Returning to the timing diagram, FIG. 5(*d*) presents the optical output of the device 30. This waveform, in contrast to the output of the coupler 24 (the optical signal input to the device 30), is devoid of the intensity spikes that characterize the optical waveform of FIG. 5(*b*). Rather, the intensity of the waveform of FIG. 5(*d*) in the regions of the former intensity spikes may, in fact, be less than the useful signal portions intermediate the end points of the loop transit modulation periods. Such periodic diminutions of optical intensity may be achieved in a number of ways in accordance with the type of device 30 employed and its associated principle of operation. Generally, however, it will be understood that the optical signal trimming device 30, whatever its configuration, is electrooptic in nature, acting upon, and causing resultant optical effects in response to a driving electrical input. An electrooptical material, such as $LiNiO_3$, provides an essential operative element of such a device.

FIGS. 6(*a*) and 6(*b*) are schematic diagrams of alternative embodiments of the invention characterized by different physical arrangements for achieving the required functional operation of the optical signal attenuator 30. As far as other elements of the IFOG are arranged and located, as in the "basic" configuration of FIG. 4 above, such corresponding elements are referred to by like numerals.

The embodiment of FIG. 6(*a*) employs a so-called cutoff or amplitude modulator as the optical signal attenuator 30. As in the basic configuration, the cutoff modulator is located in the optical path between the first coupler 20 and the photodetector 32. Such location assures that an optical signal of the form of FIG. 3 (or FIG. 5(*b*)), with undesired intensity spikes, is received at the attenuator 30. The modulator includes a substrate 34 of electro-optically active material such as $LiNiO_3$. An elongated internal waveguide 36 is formed of highly-doped $LiNiO_3$. Metallized electrodes 38 and 40 are located atop the substrate 34 at opposite sides of the waveguide 36. Such electrodes 38, 40 receive and apply predetermined voltage signals across the waveguide 36, producing electrical fields that control its optical properties (i.e. mode field size). Referring back to FIG. 5(*c*), the application of such a periodic voltage profile will render the waveguide 36 lossy on a periodic basis. By altering the mode field size of the highly-doped waveguide 36, light travelling through it becomes correspondingly less guided, or unguided, propagating into the substrate 34 rather than passing to the photodetector 32. In effect, the amplitude or cutoff modulator acts as an optical choke in the presence of an appropriate electrical signal. The periodic diminutions seen when one compares the signals of FIGS. 5(*b*) and 5(*d*) to one another reflect such operation of a cutoff modulator as the attenuator 30.

The IFOG of FIG. 6(*b*) employs a Mach-Zehnder interferometer as the optical signal trimming device 30. Again, such interferometer is located between the first coupler 20 and the photodetector 32. The interferometer is formed upon a substrate 42 of electro-optically active material such as $LiNiO_3$. An upper waveguide 44 and a lower waveguide 46 are formed of highly doped regions of the substrate 42. The waveguides 44 and 46 meet at input and output Y-junctions 48 and 50, respectively. The input Y-junction 48 splits the input optical signal into two signals that are "regrouped" at the output Y-junction 50. Pairs of electrodes 52, 54 and 56, 58 are located at opposite sides of the waveguides 44 and 46. The interferometer operates by selectively retarding the phase of light passing through one of the waveguides with respect to that passing through the other. By controlling the amount of phase retardation of light traveling through one waveguide with respect to that traveling through the other, one can control the destructive optical interference that takes place at the output Y-junction 50. In the event that, through the imposition of a voltage (or voltages) of sufficient magnitude, a phase difference of $\pm\pi$ radians were to be created between the light traveling through the waveguides 44 and 46, total destructive interference would take place upon recombination at the output Y-junction 50, blanking the optical signal.

Figure 5A:
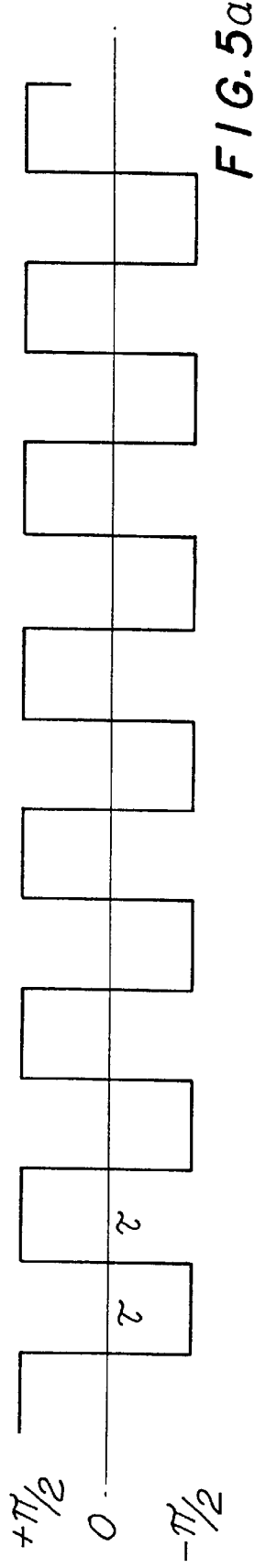
FIGS. 5(a) through 5(d) are a series of waveforms for illustrating the operation of an IFOG in accordance with the invention.
Figure 5B:
Figure 5C:
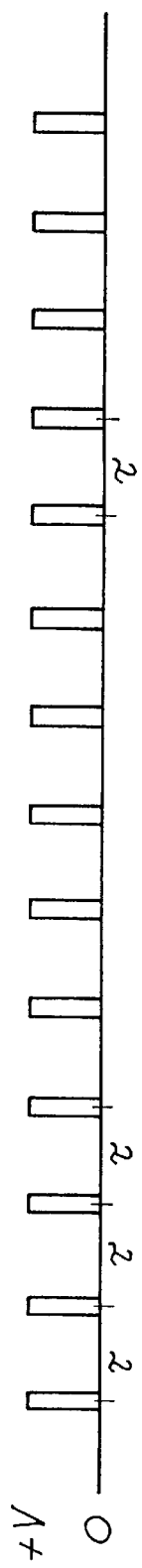
Figure 5D:
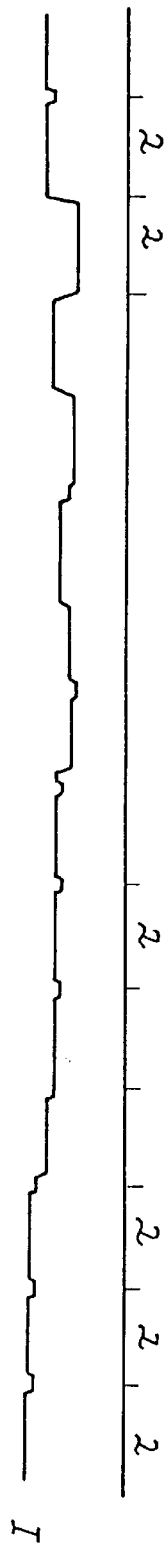

As can be seen, both an amplitude modulator and a Mach-Zehnder interferometer may be effectively employed as the optical signal trimming device of an IFOG in accordance with the invention. In either case, a periodic electrical driving signal of the form illustrated in FIG. 5(c) may be employed to reduce the optical signal of FIG. 5(b) that characterizes present day IFOG's to the form of FIG. 5(d). As discussed above, such an optical signal, devoid of so-called ears, is much more suitable for down-line electronic processing than that of FIGS. 3 (or 5(b)). Further, the input of an optical signal of the form of FIG. 5(d) is readily processed and significantly reduces design limitations upon gyro electronics relative to large amplitude transition spikes.

While the benefits of the invention are apparent when described with reference to the processing of the optical output signal of a gyro modulated by the imposition of conventional $\pm\pi/2$ phase modulation, the apparatus and methods of the invention are equally applicable to IFOG's that employ other periodic modulation schemes. In fact, the benefits of the invention became even more pronounced when applied to an IFOG employing overmodulation (e.g. $\pm 3\pi/4$). In such a case, the intensity of the useful portion of the output optical signal is less than that of $\pm\pi/2$ modulation. The maxima of the optical signal due to spiking are the same as in the case of $\pm\pi/2$ modulation. Thus the absolute sizes of the intensity spikes in the case of overmodulation are greater from those for $\pm\pi/2$ modulation. For this reason, the degradation of accuracy is greater in the case of overmodulation and the benefits of the teachings of this invention are correspondingly even greater.

The embodiments have been described in considerable detail. However, it is to be understood that the invention can be carried out by specifically different methods and devices. Various modifications can be accomplished without departing from the scope of the invention itself.

What is claimed is:

1. A fiber optic rotation rate sensor comprising, in combination:
   a) a source of optical energy;
   b) an optical fiber, said fiber being formed into a coil located intermediate its opposed ends;
   c) means for dividing the output of said source into two light beams;
   d) means for launching said light beams into said fiber so that said beams counterpropagate within said optical coil;
   e) means for imposing a periodic artificial phase difference between said counterpropagating beams of light;
   f) means for recombining said counter-propagating beams into an optical output signal characterized by intensity spikes having a period equal to the loop transit time;
   g) means for periodically attenuating said intensity spikes; and
   h) a photodetector for receiving said periodically attenuated optical signal and converting it to a responsive electrical signal.

2. A fiber optic rotation rate sensor as defined in claim 1 wherein said means for selectively attenuating is located within the optical path intermediate said means for recombining and said photodetector.

3. A fiber optic rotation rate sensor as defined in claim 2 wherein said means for selectively attenuating is responsive to an electrical input signal.

4. A fiber optic rotation rate sensor as defined in claim 3 further characterized in that said means for selectively attenuating comprises a cutoff modulator.

5. A fiber optic rotation rate sensor as defined in claim 3 wherein said means for selectively attenuating comprises a Mach-Zehnder interferometer.

* * * * *